United States Patent [19]

Graham

[11] 4,204,657
[45] May 27, 1980

[54] LIFE AND WEIGHT SAVING AIRCRAFT SEAT STRUCTURE

[76] Inventor: Edward F. Graham, 349 Rosebank Ave., Baltimore, Md. 21212

[21] Appl. No.: 920,955

[22] Filed: Jun. 30, 1978

[51] Int. Cl.² .................. B64D 11/06; B64D 25/04
[52] U.S. Cl. .................. 244/122 R; 244/129.2; 297/DIG. 3; 297/DIG. 5
[58] Field of Search .......... 244/122 R, 129.2; 297/DIG. 3, DIG. 5, 192, 180; 169/11, 57; 5/365, 368

[56] References Cited

U.S. PATENT DOCUMENTS

| | | | |
|---|---|---|---|
| 1,823,569 | 9/1931 | Mellano | 297/DIG. 3 X |
| 2,057,687 | 10/1936 | Manson | 244/122 R X |
| 2,350,679 | 6/1944 | Hann | 244/122 R |
| 2,602,614 | 7/1952 | Cole | 169/57 X |
| 2,684,672 | 7/1954 | Summerville | 297/180 X |
| 2,916,081 | 12/1959 | Pinkel | 244/122 R X |
| 3,192,540 | 7/1965 | Swank | 244/122 R X |
| 3,192,541 | 7/1965 | Moore | 244/122 R X |
| 3,330,598 | 7/1967 | Whiteside | 297/DIG. 3 X |
| 3,603,535 | 9/1971 | DePolo | 244/121 |
| 4,031,579 | 6/1977 | Larned | 297/DIG. 5 X |

FOREIGN PATENT DOCUMENTS 929287  6/1973  Canada .................. 297/DIG. 3

OTHER PUBLICATIONS

"Fuel Efficiency", *Aviation Week & Space Technology*, May 20, 1974, p. 72.
"Fokker Fuel Efficiency", *Flight International*, Dec. 27, 1973, p. 1054.
*Air Carrier Cabin Safety*, F.A.A., Dec., 1976, pp. VI-4 & 5, VI 21, 36 and 37.
"Full-Scale Aircraft Cabin Flammability Tests of Improved Fire-Resistant Materials Test Series II" NASA TM X-58172, 4/1976, pp. 17, 35, 46.
*Aircraft Seat Cushion Materials Tests*, NASA, JSC 09929, 10/1975, pp. 6, 8, 12, 14.

*Primary Examiner*—Barry L. Kelmachter
*Attorney, Agent, or Firm*—John F. McClellan, Sr.

[57] ABSTRACT

Life and weight saving aircraft seat structure employs frame supported interconnected pneumatic seat and seatback cushions with automatic compensation for pressure and temperature changes primarily by provision of predetermined pneumatic overflow envelope elastic force variables; in preferred embodiment self-extinguishing inflating gas is provided, a vented sleeve or sheath limits amount of expansion of the overflow envelope and an overflow relief valve limits system pressure.

18 Claims, 25 Drawing Figures

LIFE AND WEIGHT SAVING AIRCRAFT SEAT STRUCTURE

This invention relates generally to aircraft structure and particularly to aircraft occupant seating.

Principal objects of the invention are to provide a pressure change compensating pneumatic seat and seatback cushion system with advantages overcoming several grave deficiencies in the past and the present art.

In the prior art pneumatic seating elements have been known, as indicated by the following U.S. Pat. Nos.:

3,603,535 to M. De Polo, 9-7-71, discloses $CO_2$ panels on seating and other places in aircraft;

3,330,598 to G. H. Whiteside, 7-11-67, discloses selectively pressurizable seat components;

3,192,541 to B. S. Moore, 7-6-65, discloses contourable pneumatic cushions in chair structure and particular valving; p0 3,192,540 to R. E. Swank, 7-6-65, discloses another form of adjustable pneumatic cushioning;

2,916,081 to I. Pinkel, 12-8-59 discloses use of pneumatic structure in an aircraft crash resistant seat;

2,350,679 to K. G. Hann, 6-6-44, discloses a pneumatic chair 2,057,687 to F. G. Manson, 10-20-36, discloses a penumatic airplane seat;

1,823,569 to A. V. Mellano, 9-15-31 discloses a partially expandable pneumatic seat cushion for vehicles; part of the cushion may be of inestensible material or covered with inextensible material; means to control expansion of the extensible part are described, including chamber interconnections.

Canadian Pat. No. 929,827 to Copeland and McGregor, 6-26-73 discloses an open-cell foam cushion enclosed in a hermetic cover with manually operated control valve actuable to admit or exhuast air, and also provision for venting at a predetermind pressure differential in aircraft use.

Carbon dioxide inflation of crash structures is known, and for the purpose of fire extinguishing.

However, it is believed that this prior art taken altogether fails to make fair suggestion of the present invention, according to the objects of which provisions are made to solve an interlocking complex of problems in the aircraft seating art including (a) unnecessary flame, smoke and fume hazards, (b) excessive aircraft fuel consumption because of excessive weight, and (c) inadequate shock absorption.

These problems have and are continuing to cost many lives each year and much money each hour. They stem primarily from materials used for seat cushioning and seatback cushioning in aircraft, which materials have evolved from early structures such as air pillows, canvas slings, wickerwork, cotton or hosehair stuffed pillows, to the present solid polyurethane foam cushions overlying supporting structure, which has been in airline use for a considerable number of years.

(a) CURRENTLY UNNECESSARY FLAME, SMOKE AND FUME HAZARD

With the continued loss of life during crashes, much of it attributable to the flammability of seat cushioning and resultant production of large amounts of heat, black smoke and toxic gases, government and industry efforts are directed toward treatment of cushions with fire retardant chemicals. Fire retardant treatment has met with some success but the production of smoke, toxic gases and the amount of cushion material burned, continue at unacceptably high levels. In crashes involving cabin fires, lethal hydrogen cyanide production and oxygen depletion continue, causing much loss of life.

Because seat and back cushions comprise a very large percentage of flammable cabin materials, elimination of as much flammable material as possible appears essential. It is estimated that the present invention will perform the same seating functions as the present polyurethane structure while reducing flammability approximately 70% with the resultant proportional reduction of flames, smoke and toxic gases, and at least quaivalent reduction in human casualties. Further, in the pneumatic seating structure of the present invention, the inflation gas can be carbon dioxide with inherent capability of suppressing fire at the point of any burnthrough of cushion.

(b) CURRENTLY EXCESSIVE AIRCRAFT FUEL CONSUMPTION BECAUSE OF EXCESSIVE WEIGHT OF SEATING

A further and very important economic advantage to the airline industry, beset by increasing high fuel and labor costs, is the significant reduction in weight provided by the present invention, permitting parallel reduction in operation expense per unit payload. Airlines are presently largely converting to highly densified seating patterns to secure high load factors. Prior to this invention, beyond the approximately 11% increase in seating capacity yielded, any additional flexibility to increase passenger revenue has appeared sharply limited.

However, other very important improvements lie in the large reduction of weight, cost of operation and a resultant saving in energy by reduced fuel consumption provided by this invention. The above referred to efforts by government and industry to treat aircraft foam cushions with fire retardant chemicals such as has been done with "Scott" and "Mobay" 3 in. thick fire resistant treated foams, with densities of 3.3 lbs/cu. ft. and 5.3 lbs/cu. ft. respectively, resulting in a weight of 4.963 lbs. and 7.971 lbs. for one set of seat and back cushions respectively. In accordance with objects of the present invention, an estimated calculated total weight of 1.810 lbs. for a pneumatic seat and back cushion results in a total approximate savings in weight for a 289 passenger Lockheed L-1011 aircraft of 860 lbs. and 1,210 lbs. respectively over the 3.3 and 5.3 / cu. ft. cushions. Savings in operational costs per aircraft at $11.00 per pound cost of excess weight equals $9,460.00 and $13,310.00 per annum. A fleet of 28 L-1011 aircraft would therefore save $264,880.00 and $372,680.00. Because these weights and costs are based on use in the invention of three inch thick cushions, comparable savings in weight and cost would increase with thickness increase.

An additional advantage in weight saving is safety; further safety in take offs and landings can be attained through reduction in weight, for example.

(c) CURRENTLY INADEQUATE SHOCK ABSORPTION

In conjunction with commercial aircraft crashes it is to be noted that even though post crash fire may not occur, statistics show that impact loads are often in a range susceptible of crucial improvement through improved passenger seating protection. Accidents have occurred wherein vertical decelerations with very high "G" loadings 7.5 G recorded on the flight recorder, are developed; fourteen occupants in one crash received severe lumbar fractures. Since many existing foam cushions are constructed with non-treated, very low density open cell foam (1.8 to 2.5/cu. ft.) to save weight, and because passenger weight severely pre-compresses seat cushions, the shock absorption characteristics are of a low order. An object of the present pneumatic cushion invention equipped with pressure relief is to function in a similar fashion to an aircraft landing gear pneumatic shock strut, thereby reducing the load on the passenger through the greater absorption of energy by pneumatic cushion exhaust of controlled amounts of air to the cabin atmosphere through pressure relief valve structure.

Further objects of the present invention therefore are to provide aircraft seating which will improve the entire range of problems mentioned and others through use of much smaller amounts of flammable material and use of extinguishing gas for reducing fire hazards; through the use of lighter, generally soft materials and less material total, improving load efficiency and safety; through the use of design lessening crash impact injury to passengers; through the use of better shock absorption and less mass to contribute to breakaway problems, all in a comfortable, simple, economical and durable aircraft seating design which is flexible in application, pleasing in appearance, and requires no passenger or crew attention in use.

In brief summary given for purposes of cursive description only and not as limitation, the invention includes inflation seating-structure with interconnection to an envelope having predetermined inflation variation for expansion control, and overload protection.

Figure 1:
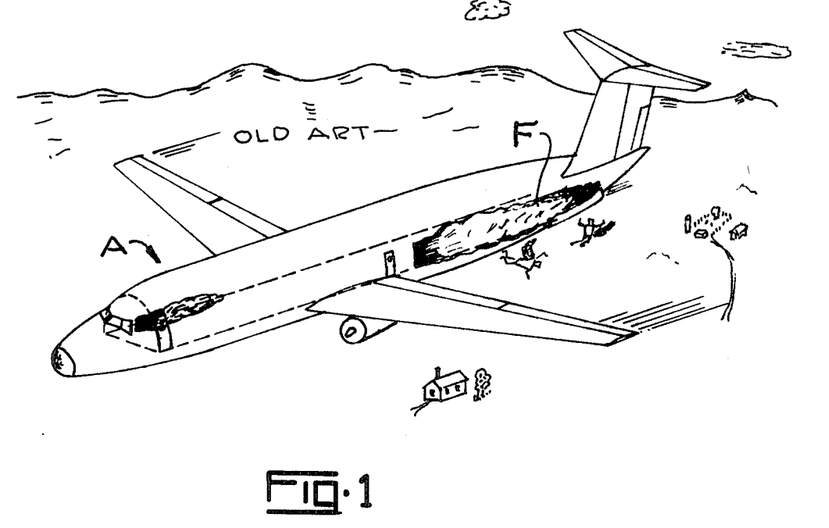
FIG. 1 is a perspective view of an aircraft on fire at altitude.
Figure 2A:
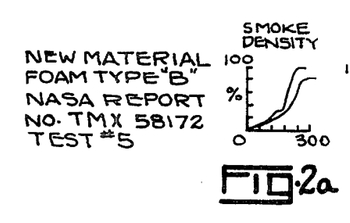
FIGS. 2a through 2e are graphs of characteristics of flammable, fire resistant-treated polyurethane cushions when on fire.
Figure 2B:
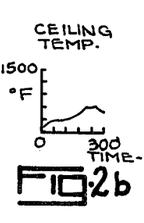
Figure 2C:
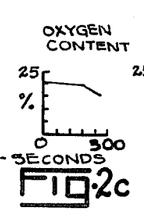
Figure 2D:
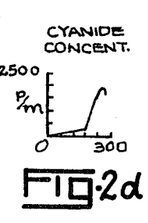
Figure 2E:
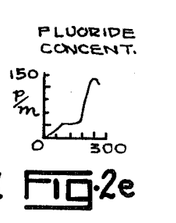

The above and other objects and advantages of this invention will become more readily apparent on examination of the following description, including the drawings in which like reference numerals refer to like parts:

FIG. 1 is intended to illustrate forcefully direct and indirect hazards of fire aboard a commercial aircraft A. Regardless of whether at altitude or on the ground, such fires generate heavy smoke and fumes F which endanger passengers.

A substantial portion of the annual commercial-airline death and injury toll originates directly or indirectly in fire, and burning of passenger seat materials accounts for a significant part of the total.

FIGS. 2a-2e show as an example of seat material hazards, test results reported by the National Aeronautics and Space Agency in publication No. TMX-58172 dated April 1976 and titled "FULL SCALE AIRCRAFT CABIN FLAMMABILITY TESTS OF IMPROVED FIRE-RESISTANT MATERAILS-TEST SERIES II" in terms respectively of smoke density, space ceiling temperature, oxygen depletion, cyanide and fluoride concentrations. The Foam Type "B" referred to is a polyurethane foam, weighing 3.3 and 5.3 lbs./cu. ft. (1,497 and 2,404 kg/cu. meter) being anticipated for use on the average for each seat.

The present invention, in contrast with the above and according to important objects provides structure permitting deletion of 75% of the polyurethane foam from aircraft seating, proportionally decreasing fire hazards, and through special provisions reducing impact hazards, while at the same time significantly reducing total weight of seating.

Figure 3A:
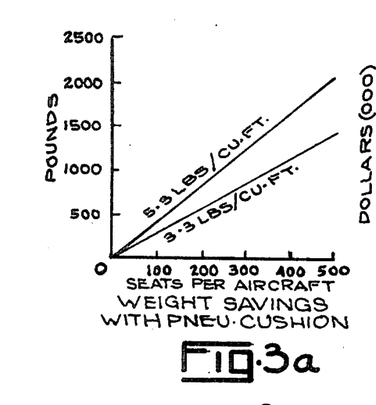
FIGS. 3a through 3c are graphs of estimated savings with the present invention.
Figure 3B:
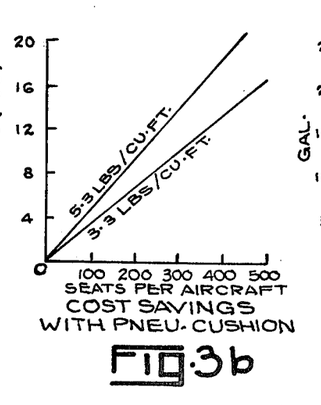
Figure 3C:
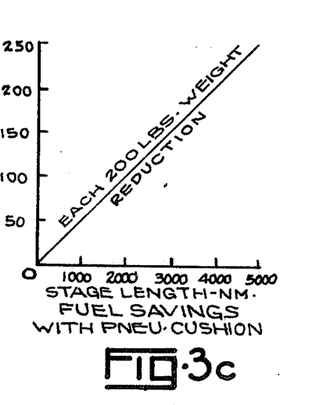

FIG. 3a graphs the substantial projected weight savings achievable over conventional structure according to objects of this invention; FIG. 3b similarly graphs corresponding annual operating cost savings, and FIG. 3c, fuel savings consequent to the estimated 2.76 to 4.17 lbs./seat savings in weight over conventional structure by the present invention pneumatic seating.

It would seam that these savings could in part at least be provided by use of lightweight air mattress or air pillow structure of more conventional design, but such is not the case because passenger service seating for aircraft must meet many special demands, including that of maintaining contour at altitude and generally consistent internal pressure.

Figure 4A:
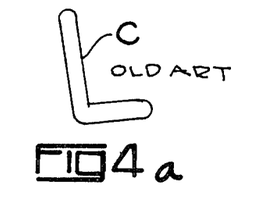
FIGS. 4a and 4b are side elevational diagrams of closed pneumatic cushioning at two altitudes.
Figure 4B:
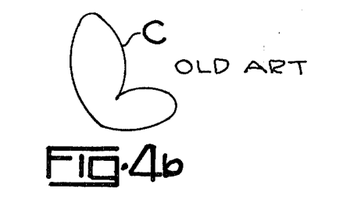

FIGS. 4a and 4b by contrast with each other diagram pressure distortion of a conventional pneumatic seat C when taken from ground level to altitude without venting. Reductions in pressure which occur in pressurized cabin aircraft (4lbs./sq. in at 8000 ft. pressure altitude typically) to some extent and in other aircraft to a greater degree, tend to expand such furniture out of shape, and because of this and increased pressure to make it less comfortable.

In contrast with such, the following Figures show the relatively constant shape and pressure provided by the present invention.

GENERAL FUNCTION OF THE INVENTION

Figure 5A:
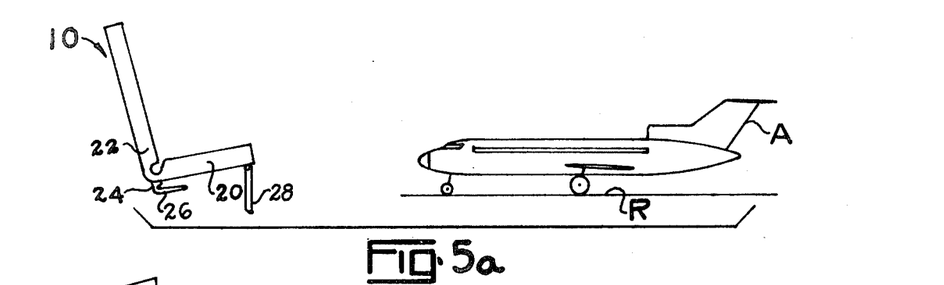
FIG. 5a diagrams the present invention in side elevation without passengers and at an altitude (ground) indicated by the aircraft diagram at right.

FIG. 5a diagrams pneumatic seating according to the present invention, embodied in an aircraft seat 10 having conventionally positioned seat cushion 20 and seat back cushion 22, but with pneumatic connection 24 between them to overflow envelope 26 which is part of a specialized expansion chamber mounted beneath the seat, and the whole supported by a frame 28, fragmentarily shown. The seat is indicated as being at ground level, as in aircraft A at right on a runway R.

Figure 5B:
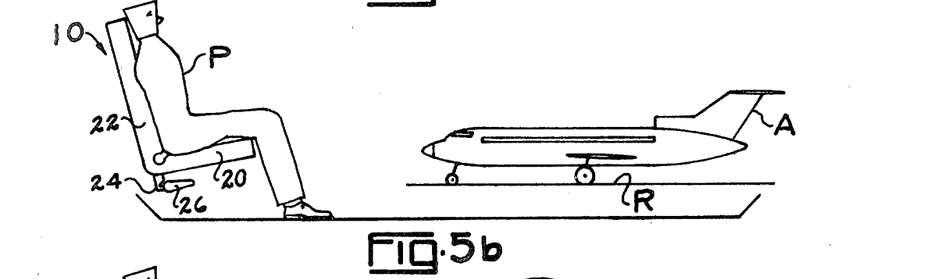
FIGS. 5b through 5e similarly diagram the present invention in use in successive stages of flight indicated by the respective aircraft diagrams.

FIG. 5b is the same showing as in the previous Figure but with a passenger P resting on the seat 10, the increased pressure of this loading causing the overflow envelope 26 slightly to expand elastically thereby maintaining substantially the same seating pressure and configuration as in the unloaded condition.

Figure 5C:
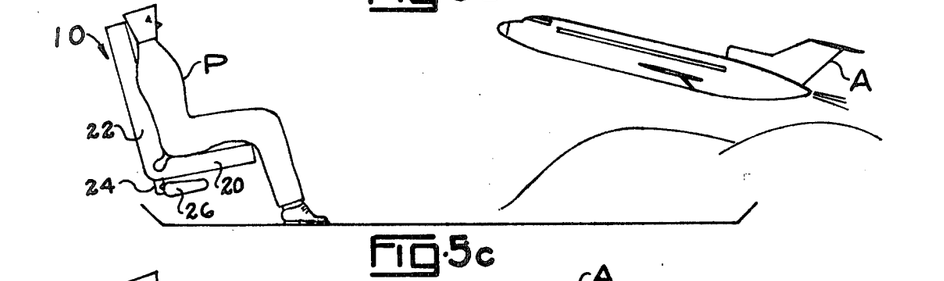

FIG. 5c indicates as next step in the sequence that as the aircraft rises from the runway, the customary reduction in cabin pressure is accommodated by further expansion of the overflow envelope 26.

Figure 5D:
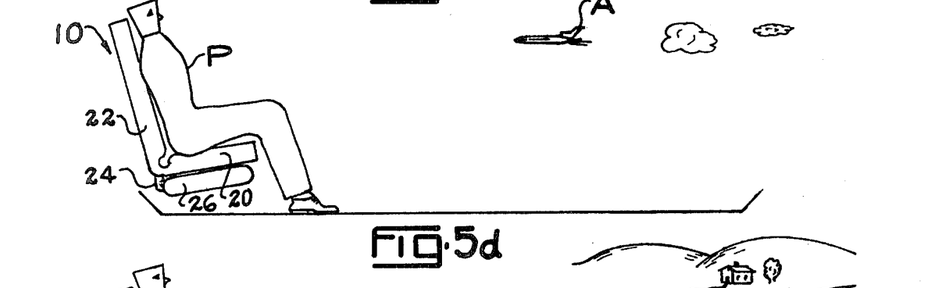

FIG. 5d illustrates the full expansion of the overflow envelope 26 at highest cruising altitude, maintaining substantially the same seating configuration and pressure as on the ground.

Figure 5E:
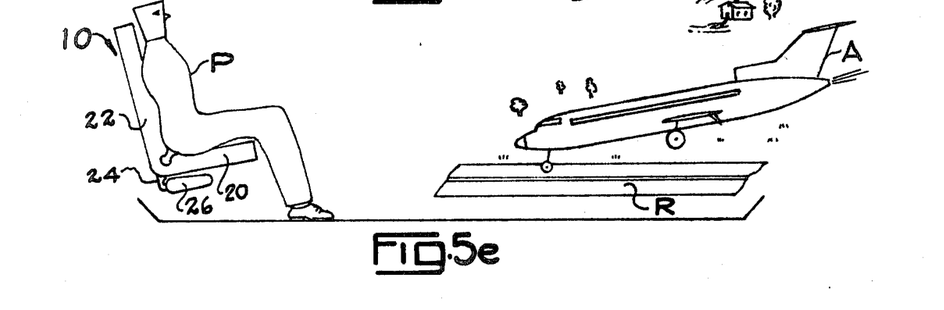

FIG. 5e shows return to landing altitude with proportional reduction in size of overflow envelope 26 maintaining the comfort of the seating and the seating configuration as before.

GENERAL STRUCTURE

Figure 6:
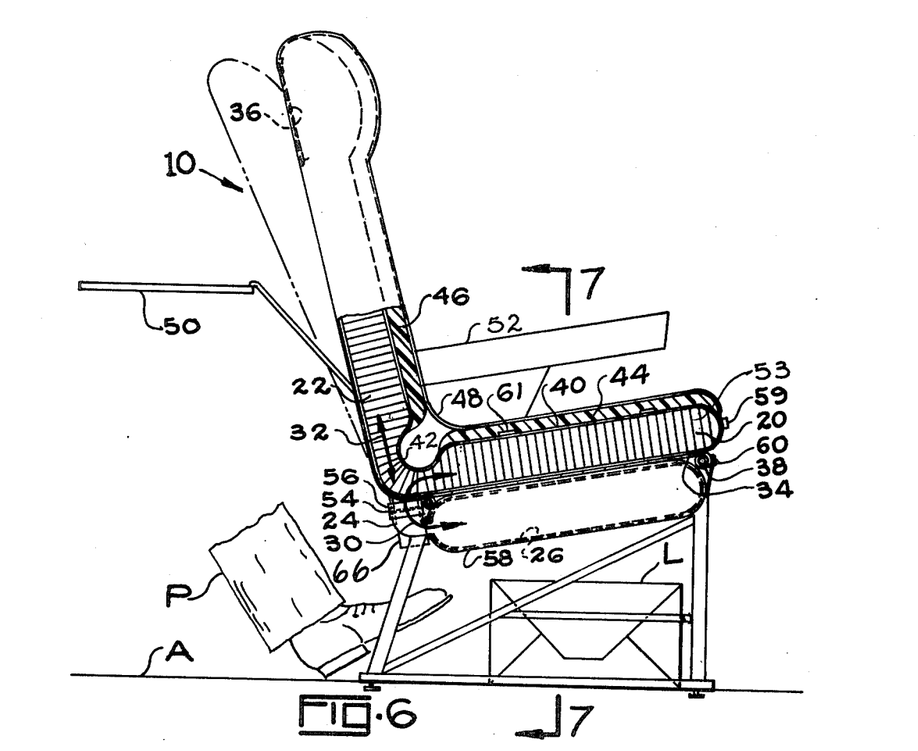
FIG. 6 is a side elevational view of the invention, partly in section.

FIG. 6 details provisions of the present invention 10, which is shown at highest cruising altitude in an aircraft A in which installed, with overflow envelope 26 fully extended as result of pressure-reduction expansion of gas (arrows 30, 32) from the first pneumatic structure or seat cushion 20 and seatback cushion 22, respectively through pneumatic connection 24 to the second pneumatic structure or overflow envelope 26.

The seatback cushion 22 and seat cushion 20 extend fully over the continuous seat pan 34 and seat back pan 36 which conventionally span the conventional spaced-tubing frame 38, and the seatback cushion and seat cushion preferably form a one piece enclosure of flexible material 40 which may be any substantially inelastic fire resistant, abrasion-resistant, hermetically sealable and durable material such as "Nylon" (poly-carbonate-sheeting, in the thickness range of 0.003 to 0.017 inch (0.09 to 0.042 mm). Such material only weighs from 0.250 oz. to 2.4 oz/sq. ft. A full-width interconnection is preferably provided between seat cushion and seat back, this first pneumatic connection being preferably roundly contoured inwardly on the inner surface to foam a non-constricting hinge portion 42 permitting, customary seat back angle adjustment without crimping.

Covering the passenger supporting surfaces or upward surfaces of the seat cushion and seat-back cushion, may be respective relatively thin layers of fire retardant treated polyurethane foam 44, 46. Because the primary cushioning is supplied by the pneumatic structure these may be as thin as 0.75 inch (18.8 mm) or 25% of the usual thickness and weight employed in current seating, just sufficient for ventilation. Over all, a conventional fire-resistant seat cover 48 such as that sold under the "NOMEX" trademark may be used, and the seat may have conventional table back 50, arm rest 52 and the like. Threads 53 retain shape.

The pneumatic connection 24 from seating to overflow envelope 26, or second pneumatic connection, may be conventional and preferably is disconnectable, as by means of mating, clamped-together flange structure 54, 56, which may be entirely of elastomeric material, and which preferably curves behind or outside the seat frame and down and forwardly to the overflow envelope structure, the rearward edge of which it may support. A collapsible tubular sheath 58, which is described in detail in reference to the next Figures, covers the overflow envelope. A conventional filler valve 59 is provided. Suitable quick-detach attachments such as snap fasteners 60 hold the pressure compensating seating system to the frame; one is shown fixing the forward edge of the sheath to the seat frame, generally parallel with and beneath the seat cushion and pan structure, where the sheath is out of the way of feet of passengers P and of luggage L. Element 61 is a low temperature button which will be explained in reference to the last two Figures in the specification.

Figure 7:
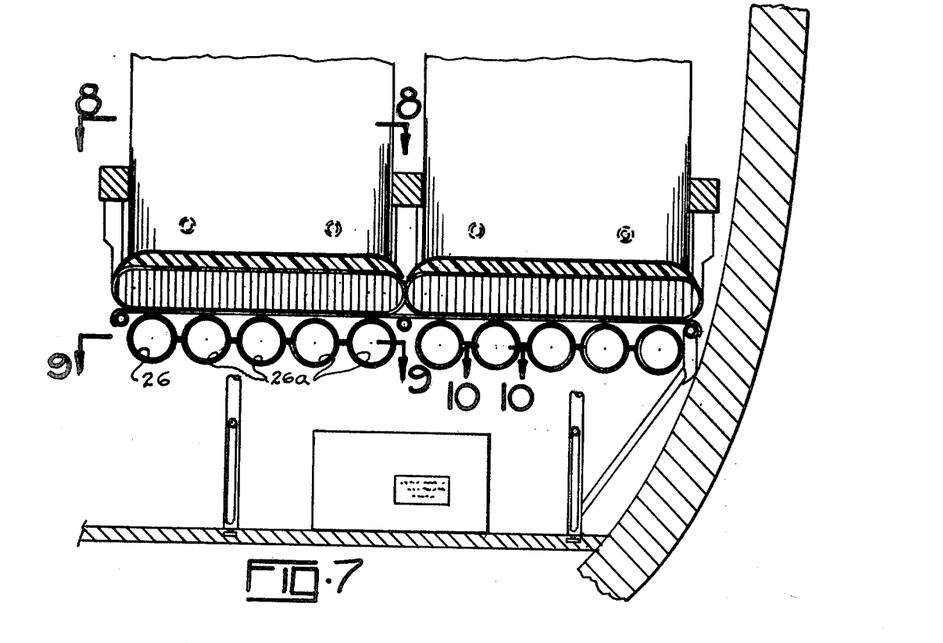
FIG. 7 is a view taken at 7—7, FIG. 6.
Figure 8:
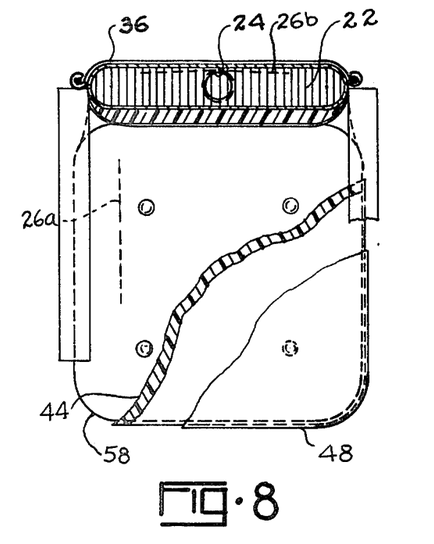
FIG. 8 is a view taken at 8—8, FIG. 7.
Figure 9:
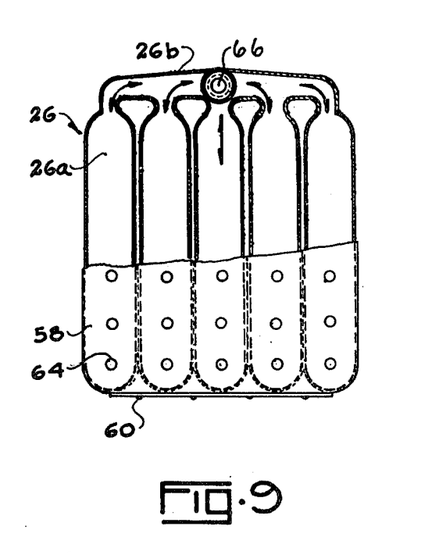
FIG. 9 is a view generally adapted from 9—9, FIG.

FIGS. 7, 8 and 9 indicate that the underseat structure comprises a novel combination resulting in an effective expansion chamber structure believed unique. The inner part is the pneumatic envelope 26 which preferably comprises plural expansible tubes 26a connected transversely by a header 26b (best shown in FIGS. 8 and 9) enclosed in flexible fixed-volume sheath 58, sized for form-fitting the tubes at maximum expansion. Five tubes may be used for effective operation, to be discussed.

SPECIFIC DETAILS OF EXPANSION CHAMBER STRUCTURE AND OPERATION

Figure 10A:
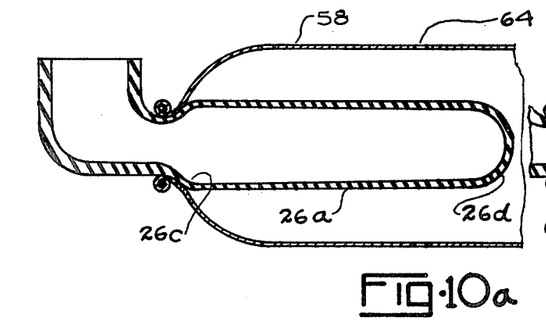
FIG. 10a is a detail adapted from 10—10, FIG. 7.

FIG. 10a shows a portion of the expansion chamber structure of the invention in sectional view with the inflation-limiting, protecting, supporting, fixed-volume or inelastic sheath or envelope 58 shown in fully deployed configuration to get it out of the way for purposes of exposition. Normally it would tend to follow deployment boundaries of the elastic structure represented by elastic, tubular envelope structure 26.

The overflow envelope is of material with substantial elongation, tensile strength, resilience, gas impermeability, and resistance to aliphatic and aromatic hydrocarbons, to abrasion, and to heat ageing, such as natural rubber, natural rubber coated with nitrile, or a synthetic rubber such as nitrile, or any one of many other rubbers and laminates of rubbers which are well known for such characteristics.

The wall thickness of the elastic envelope tapers from a minimum (26c) at a first location adjacent the neck to a maximum (26d) at a second location adjacent the convex tubular end, providing progressive inflation action along the length, compensating altitude pressure changes.

Minimum thickness is chosen to be sufficient for creepless hold without inflating at cushion pressure of 1.75 to 2 lbs. per sq. in. (0.140 to 0.121 kgm/sq. cm) approximately, while progressively inflating under increases over this range, thus providing for the seat when empty to carry a shape-holding pressure but to be relieved of the overpressure when a passenger sits on it.

Said again, this structure provides means having an initial elastic inflation pressure threshold followed by progressively increasing resistance to inflation.

It will be that this structure provides a substantial and definite inflation breakaway threshold or pressure/inflation curve step in simple, economical, reliable and lightweight structure.

Overflow envelope capacity and minimum and maximum elastic envelope thickness are chosen to permit full inflation at a cabin pressure altitude of eight thousand feet, assuring no spillout of the inflating gas under normal operating conditions, and may be, for example, in the respective ranges of 825 cu. in., 0.010 in. and 0.020 in. for natural rubber.

The protective inelastic or fixed-volume sheath 58 may be of fire-retardant treated "Nylon" or other suitably strong and flexible and abrasion-resistant but lightweight material, and sized to constrain the elastic envelope at full expansion size at 8000 ft. pressure altitude and to produce an overpressure in the pneumatic system if volume and demand exceeds the size.

Figure 10B:
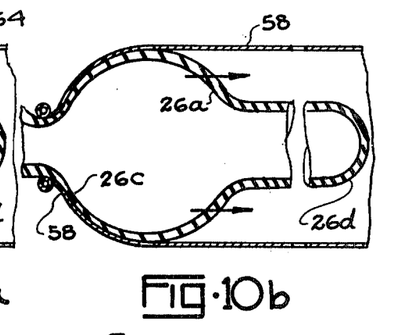
FIG. 10b similarly shows the FIG. 10 a structure at a stage of inflation.

FIG. 10b indicates the progressive nature of the inflation provided by this invention, in which the elastic material of overflow envelope 26 a advances with least chafing against the stress-relieving diametral and length constraint of the sleeve or inelastic envelope 58. Other wall taper progressions are possible but this rolling mode is believed best for smooth performance and low wear. It will be appreciated that a constant-wall-thickness elastic envelope would tend to eliminate the advantageous pressure-step or threshold between passenger loading and altitude loading of the expansion chamber, and that this obstruction-free means of producing the threshold is far simpler and more reliable than complex valving, and provides much greater and faster gas flow when necessary.

Figure 11:
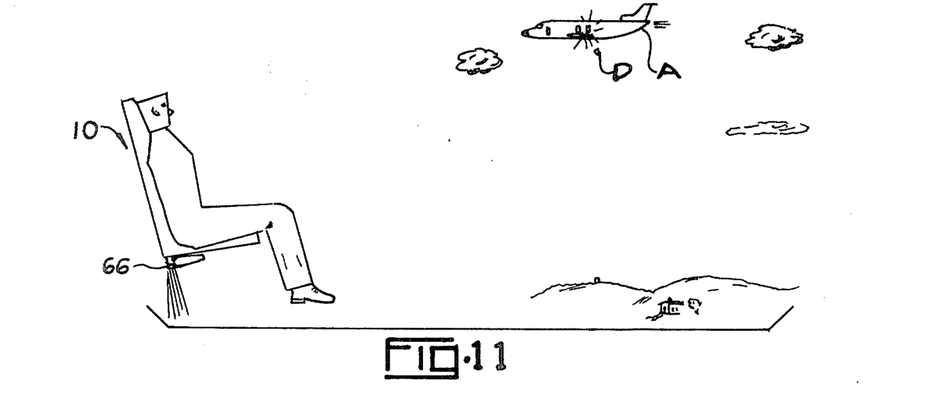
FIG. 11 is a diagram illustrating in side view effects of explosive decompression.

FIG. 11 indicates an emergency-safety feature of the invention included in the preferred embodiment, overpressure escape valve 66 which is any of a number of commercially available pneumatic valves, and may be connected to the pneumatic system in the bottom of the manifold, facing down.

Pop-off pressure and valve size are selected to preserve the pneumatic system against overpressure failures in such events as explosive decompression of the cabin, such as loss of a door D from an aircraft A, as diagrammed at right, and further, to provide progressive yielding under the passenger with energy dissipation of downward forces in a crash.

The valve may be a model C780-RPA made by Halkey Roberts Corp. with 6 lbs/□ in. overpressure setting and 1.25 in. diameter throughout, clamped to the cushion or otherwise conventionally assembled to the invention. This assumes a normal pneumatic system pressure of 2 lb/sq. in. Coacting non-stretch provisions of the seat cushion/seatback cushion/sleeve to assure non-rebound, positive, high pressure forcing of gas through the escape valve, will be noted.

Figure 12:
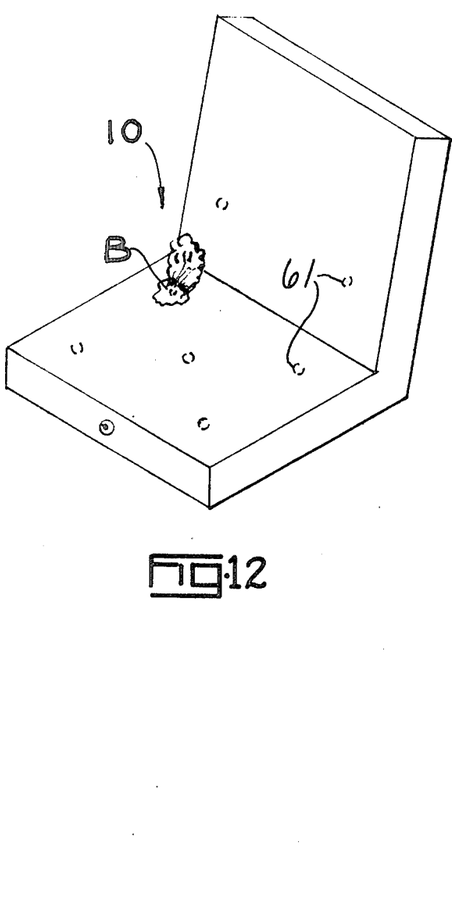
FIGS. 12 and 13 are perspective illustrations depicting effect of fire inhibition.

FIG. 12 indicates the seat-fire inhibition provided by this invention when burnthrough B releases carbon dioxide onto the burning area in the invention 10. Low temperature buttons 61 bonded to cushions at strategic points permit early release of fire suppressant gases during initial stages of fire, before higher temperatures to burn though the fire retardant nylon cushion are generated.

Figure 13:
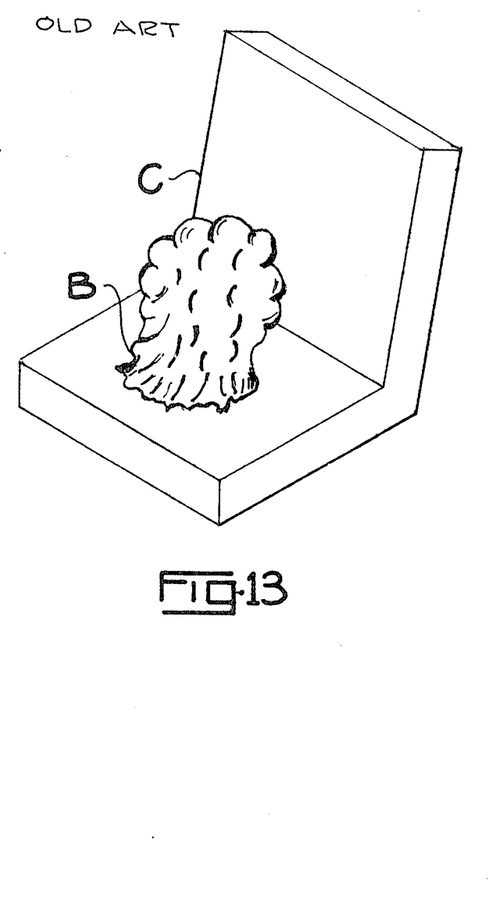

FIG. 13 indicates the old art equivalent, without inhibition of burning of seat C.

In conclusion, other advantages of the present invention will be apparent such as the anti-smuggling nature, the pneumatic cushions not offering large-volume areas which can be unobtrusively cut-open by a passenger and stuffed with contraband to be picked up from the airplane at another location by a collaborator.

Removal and replacement or repair of the invention can be as easy as removing the seat cover, unsnapping conventional snaps retaining the pneumatic structure and replacing or inspecting and repairing it on the spot.

The simple snap fasteners, in permitting rapid removal of the inflated seat cushions provide for ready use of the inflated seat cushions as life savers upon inadvertent letdowns in water such as the recent event off Pensacola, Fla. which drowned several airline passengers. This advantage is particularly valuable in view of the current policies permitting removal of life rafts from aircraft in certain routes over water, and further in view of passenger confusion in attempting to don life jackets under emergency conditions.

It will be apparent that the $CO_2$ gas in the cushions can be used to extinguish fires away from the seat locations, the detached cushions being carried about as portable fire extinguishers. In place, the fire-resistant material treated sheath can also act as temporary barrier against flames reaching upward through the seat, as from flaming parcels, or the blowtorch effect recently reported from a broken fuel line fire in an aircarft.

However, it will be appreciated that the invention can be used without the sheath structure, in non-preferred embodiment, and similarly, without the shape-preserving division into plural tubes.

A further advantage of the invention was observed in recent tests by the inventor: it dissipated heat much more rapidly than polyurethane foam in equivalent thickness (3 inches). This will obviously increase passenger comfort by reducing sweating.

Further advantages will be evident in that any seat vandalism would immediately show itself, indicating the perpetrator; that seating according to this invention will absorb less on accidental spillage of flammable liquids, and that any deterioration of fire-resistant materials would be comparison with conventional seating result in less danger.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In an aircraft seat having a frame including leg structure supporting seat structure and seatback structure, the improvement comprising: a pressure-change compensating seating system comprising: a first pneumatic structure of flexible material including a seat cushion and a seatback cushion, a second pneumatic structure of flexible material comprising an overflow envelope, a first pneumatic connection between the seat cushion and the seatback cushion, a second pneumatic connection between the first pneumatic structure and the overflow envelope; the first pneumatic structure flexible material being substantially inelastic and the overflow envelope flexible material being substantially elastic, the overflow envelope having means providing an initial elastic inflation pressure threshold followed by progressively increasing resistance to inflation, and said providing means comprising the overflow envelope having wall thickness varying between a minimum thickness at a first location and a maximum thickness at a second location.

2. In an aircraft seat as recited in claim 1, a sleeve over the overflow envelope, said sleeve being of substantially inelastic material and proportioned for constraining the overflow envelope to a predetermined maximum size on inflation.

3. In an aircraft seat as recited in claim 2, means for relieving overpressure in said pressure change compensating seating system.

4. In an aircraft seat as recited in claim 3, the overflow envelope located beneath said seat structure.

5. In an aircraft seat as recited in claim 4, the means for relieving overpressure comprising a pop-off valve.

6. In an aircraft seat as recited in claim 5, the pop-off valve having attachment to said second pneumatic connection.

7. In an aircraft seat as recited in claim 3, said minimum thickness being proximate the second pneumatic connection.

8. In an aircraft seat as recited in claim 7, the second pneumatic connection being proximate a rearward portion of the seat structure and the overflow envelope extending forwardly therefrom.

9. In an aircraft seat as recited in claim 3, the overflow envelope comprising a plurality of tubular passages.

10. In an aircraft seat as recited in claim 3, the first pneumatic connection being substantially across the full width of said seat cushion and seatback cushion.

11. In an aircraft seat as recited in claim 10, the first pneumatic connection having means for preventing crimping on folding, including an inwardly curved portion thereof.

12. In an aircraft seat as recited in claim 3, said sleeve having vent structure.

13. In an aircraft seat as recited in claim 3, said pressure change compensating seating system having quick-detach attachment to the frame.

14. In an aircraft seat as recited in claim 3, said pressure change compensating seating system having therein a fire-suppressant inflating gas.

15. In an aircraft seat as recited in claim 14, said pressure change compensating seating system having fireretardant material thereon.

16. In an aircraft seat as recited in claim 15, and foam material overlay on said seat cushion and seat back cushion.

17. In an aircraft seat as recited in claim 16, a seat cover over said seat cushion and seatback cushion.

18. In an aircraft seat having a frame including leg structure supporting seat structure and seatback structure, the improvement comprising: a pressure-change compensating seating system comprising: a first pneumatic structure of flexible material including a seat cushion and a seatback cushion, a second pneumatic structure of flexible material comprising an overflow envelope, a first pneumatic connection between the seat cushion and the seatback cushion, a second pneumatic connection between the first pneumatic structure and the overflow envelope; the first pneumatic structure flexible material being substantially inelastic and the overflow envelope flexible material being substantially elastic, the overflow envelope having means providing an initial elastic inflation pressure threshold followed by progressively increasing resistance to inflation, a sleeve over the overflow envelope, said sleeve being of substantially inelastic material and proportioned for constraining the overflow envelope to a predetermined maximum size on inflation; and means for relieving overpressure in said pressure change compensating seating system.

* * * * *